United States Patent [19]

Ro

[11] Patent Number: 5,076,216
[45] Date of Patent: Dec. 31, 1991

[54] COOLANT PUMP WITH CLUTCH

[76] Inventor: Sung W. Ro, Shinheung 2-Dong, Tongbo 8-Cha Gongwon Apt. B-605, Sungnam-Shi, Kyungki-Do, Rep. of Korea

[21] Appl. No.: 584,740
[22] Filed: Sep. 19, 1990
[51] Int. Cl.$^5$ ............................................. F01P 5/10
[52] U.S. Cl. .............................. 123/41.46; 192/84 C
[58] Field of Search ............... 123/41.12, 41.46, 41.44, 123/198 C; 192/84 C, 84 PM

[56] References Cited

U.S. PATENT DOCUMENTS

| 2,919,777 | 1/1960 | Walter | 192/84 C |
| 3,455,421 | 7/1969 | Miller | 192/84 C |
| 4,305,198 | 12/1981 | Kanamaru et al. | 192/84 C |

FOREIGN PATENT DOCUMENTS 58-187515  11/1983  Japan ................ 123/41.44

Primary Examiner—Noah P. Kamen

[57] ABSTRACT

A coolant pump for a vehicle engine, which comprises an electromagnetic member connected to a belt pulley which is selectively connected to a water pump impeller, such that the pump impeller is rotated at a certain predetermined engine temperature of about 85° C. by activation of the electromagnetic member, and is not rotated below the predetermined engine temperature due to nonactivation of the electromagnetic member.

5 Claims, 2 Drawing Sheets 5,076,216

COOLANT PUMP WITH CLUTCH

BACKGROUND OF THE INVENTION

1. Field of the Invention

The present invention relates to a cooling system for a vehicle engine and more particularly, to a cooling system for a vehicle engine in which the circulation of water for cooling the engine is prevented by inactivating the water pump impeller through an electromagnetic member operatively connected to a belt pulley until continuous circulation of cooling water is required when a certain engine temperature is reached after the engine has operated. When such engine temperature is reached, the cooling system is quickly activated and the engine can be maintained at an optimum temperature.

2. Description of the Prior Art

Various types of water cooling systems are well known in the art. Such water cooling systems are provided with a water pump for circulation of cooling water through the water jacket, the water-temperature controller, and the radiator of the vehicle engine. Thus, the cooling system for a vehicle engine includes a crank pulley and a water pump pulley connected to the crank pulley through a belt and having a pump impeller so that when the crank pulley rotates, the pump impeller simultaneously rotates to continuously circulate cooling water around the vehicle engine. However, such cooling systems have a number of disadvantages. For example, as it can take a long period of time to increase to an engine temperature of about 85° C., especially when the atmosphere temperature is low such as in winter, the expected life span of such cooling systems is shortened since a sealing member can be needlessly abraded due to unnecessary water pump operation.

SUMMARY OF THE INVENTION

Accordingly, it is an object of the present invention to provide an improved cooling system for a vehicle engine.

Another object of the present invention is to provide a cooling system, which comprises an electromagnetic member connected to a belt pulley for activating a water pump impeller when the operating engine reaches a temperature of 85° C., whereafter the cooling system can be quickly activated to reduce the engine temperature.

A further object of the present invention is to provide a cooling system which prevents unnecessary abrasion of the sealing member of the water pump.

Other objects and the further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a cooling system for a vehicle engine, which comprises an electromagnetic member connected to a belt pulley which is operatively connected to rotate a water pump impeller, only when the engine temperature reaches about 85° C. by activation of the electromagnetic member, thereby preventing abrasion of the sealing member of the water pump through needless operation of the water pump impeller.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
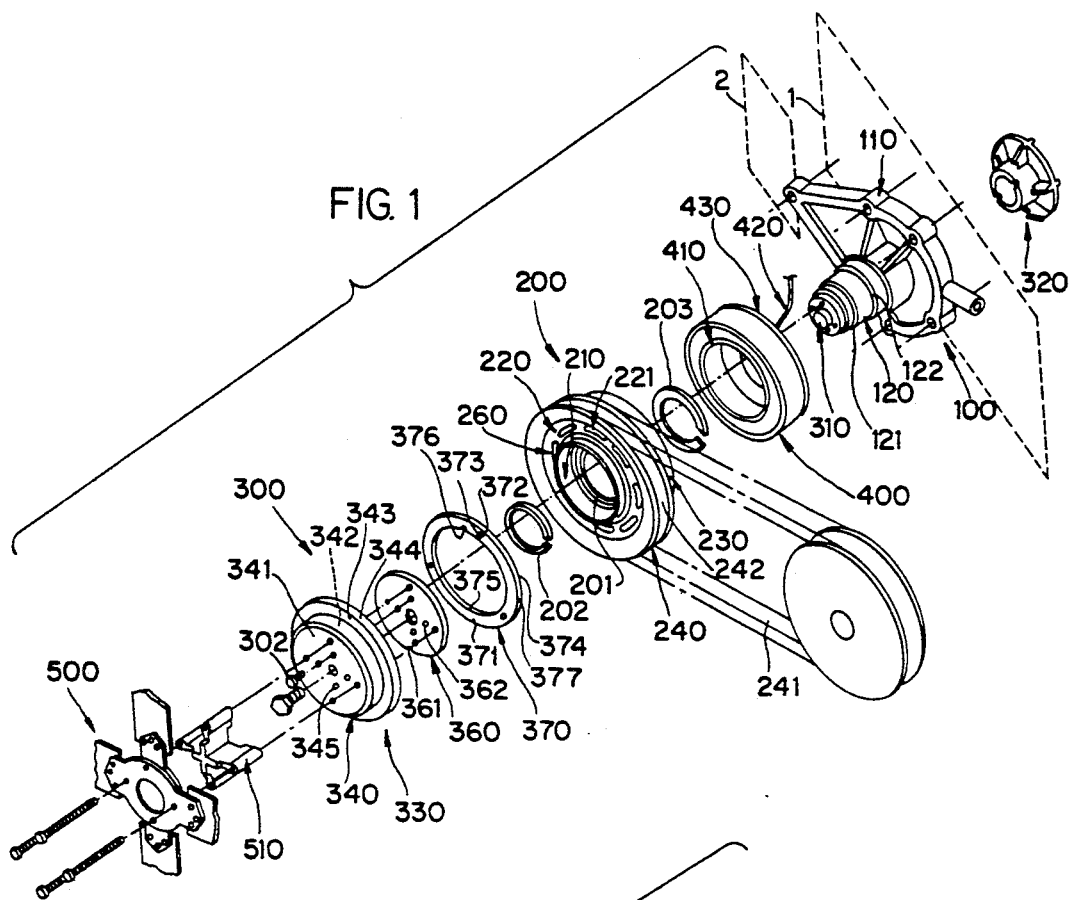
FIG. 1 is an exploded perspective view of the cooling system for a vehicle engine according to the present invention.
Figure 2:
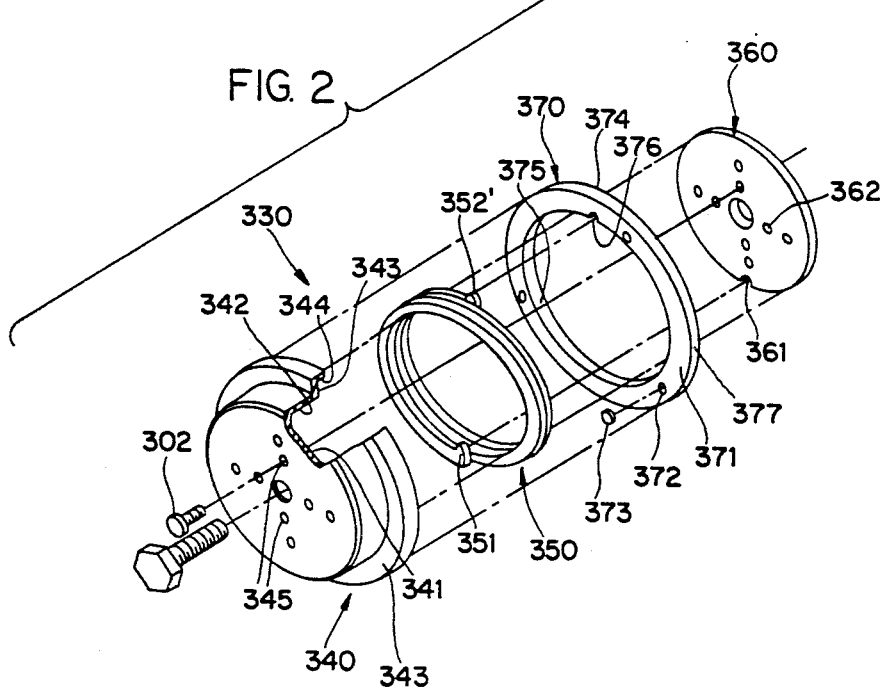
FIG. 2 is an exploded perspective view of the cooling system showing a clutch ring disposed in a pump pulley according to the present invention.

Referring now in detail to the drawings for the purpose of illustrating preferred embodiments of the present invention, the cooling system for a vehicle engine 1 (shown by dashed-line block embodiment) as shown in FIGS. 1 and 2, comprises a pump housing 100 having a tubular hub 120, a belt pulley member 200 having a belt pulley bearing ring 201 disposed therein for operatively, rotatably receiving the hub 120 of the pump housing 100, a rotor member 300 operatively, rotatably connected to the inside of the hub 120 of the pump housing 100, and an electromagnetic ring 400 disposed between the pump housing 100 and the belt pulley member 200.

The pump housing 100 is fixed to the vehicle engine and the water jacket (not shown) through a plurality of flange 110 and is provided with a pump impeller 320. The hub 120 includes a pair of hub snap ring grooves 121 and 122 disposed about the outer circumferential surface thereof.

Figure 3:
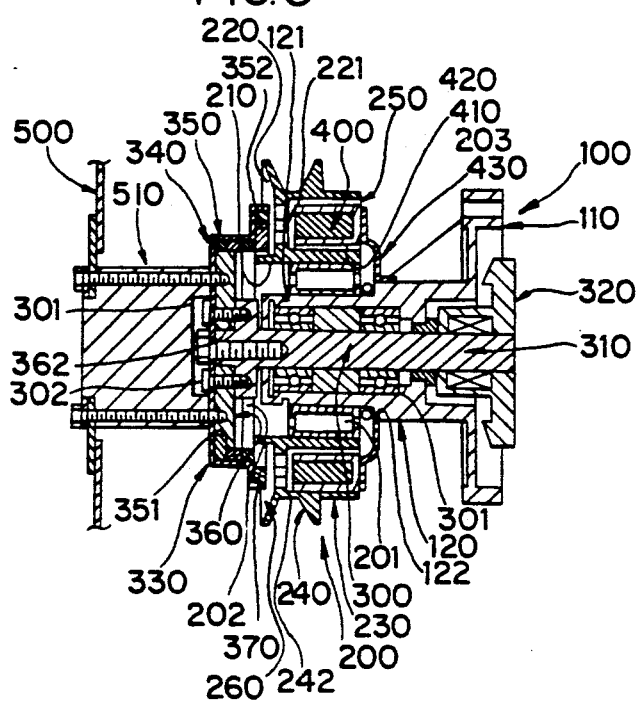
FIG. 3 is a sectional view of the cooling system for a vehicle engine in a state which the water pump and water pump impeller do not operate while the engine operates.
Figure 4:
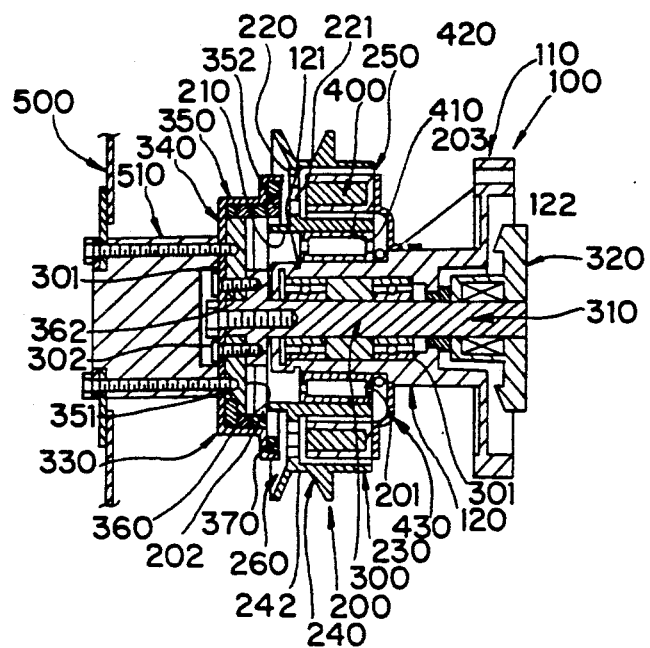
FIG. 4 is a sectional view of the cooling system for a vehicle engine in state which the water pump, the water pump impeller, and the engine operate together.

As shown in FIGS. 3 and 4, the belt pulley member 200 is provided with a pair of belt pulley snap rings 202 and 203 for engaging the pair of hub snap ring grooves 121 and 122 of the tubular hub 120. Therefore, the belt pulley member 200 does not move along the longitudinal direction of the hub 120 and only smoothly rotates around the hub 120 via the belt pulley bearing 201 thereof. The belt pulley member 200 includes a circumferential inner wall 210, an inner raised portion 220 disposed on one surface of the belt pulley member 200, and a circumferential outer wall 230 disposed on the other surface thereof for aligning with the flanges 110 of the pump housing 100. Also, the belt pulley member 200 includes a belt slot 242 of a belt engagement member 240 for smoothly receiving a belt 241. Therefore, the belt pulley member 200 is provided with a large space 250 formed by the inner wall 210, the inner raised portion 220, and the circumferential outer wall 230; a small space 260 formed by the inner wall 210, the inner raised portion 220, and the belt engagement member 240; a space formed by belt pulley bearing 201, the inner wall 210 and the hub 120; and a plurality of circular arc shaped apertures 221 disposed in the center portion of the inner raised portion 220, whereby lines of magnetic force from the electromagnetic ring 400 can easily pass through the above-mentioned apertures.

The rotor member 300 having a rotor bearing and a rotor shaft 310 is provided with the water pump impeller 320 connected to one end of the rotor shaft 310 and disposed at the engine side, and a clutching plate member 330 disposed at the other end of the rotor shaft 310. Therefore, in the cooling system of the present invention, the belt pulley member 200 rotates by itself or rotates with the water pump impeller 320, if necessary, when compared with the conventional cooling system where the belt pulley has to rotate together with the water pump impeller 320.

As shown in FIG. 2, the clutching plate member 330 includes a circular casing 340 containing a buffer spring 350, a semipermanent magnet ring 370, and a fixed circular plate 360. The circular casing 340 includes a circular plate 341 which is larger in diameter than the circumferential inner wall 210, and a stepped wall portion having a first circumferential wall portion 342, a plate ring 343, and a second circumferential wall portion 344. The buffer spring 350 as a coil spring includes end hooks 351 and 352 disposed at each end thereof, respectively. The fixed circular plate 360 is disposed within the buffer spring 350 and at this time, the end hook 351 of the buffer spring 350 is engaged with an engaging slot 361 of the fixed circular plate 360. Also, the fixed circular plate 360 has a plurality of plate apertures 362 for communicating with a plurality casing apertures 345. Therefore, after the buffer spring 350 is inserted within the first circumferential wall portion 342 and the fixed circular plate 360 is inserted into the central cavity of buffer spring 350, bolts 302 are screwed into the casing and plate apertures 345 and 362.

The semi-permanent magnetic ring 370 is made of metal and contains a plurality of permanent magnets 373 disposed into a plurality of depressions 372 in the one surface 371 thereof so that the surface 371 functions as a magnet. However, the other, opposite, surface 374 of the semi-permanent magnet 370 does not function as a magnet and only functions as a magnetic substance such as a metal. The semi-permanent magnets 373 are magnetically attracted to the buffer spring 350 and at this time, the end hook 352 is inserted into an engaging slot 376 thereof. The circumferential outer surface 377 of the semi-permanent magnet 370 is engaged within the second circumferential wall portion 344. The thickness of the semi-permanent magnet 370 is larger than, when the device is assembled, the space disposed between the semi-permanent magnet 370 and the inner raised portion 220, and the space disposed between the semi-permanent magnet 370 and the clutching plate member 330. Therefore, when the semi-permanent magnet 370 is mounted to the raised portion 220, the engaging slot 376 does not separate from the end hook 352. It is preferable that the engaging slot 376 be larger in size than the end hook 352 (FIGS. 3 and 4).

In FIGS. 3 and 4, the electromagnetic ring 400 is disposed within the large space 250 of the belt pulley member 200 and is capable of exerting its magnetic force on the surface 374 of the semi-permanent magnet ring 370 disposed within the small space 260 through circular arc shaped apertures 221 of the inner raised portion 220. The electromagnetic ring 400 includes bobbin 410 provided with an electric copper wire 420 for winding around the bobbin 410, the wire 420 leading to a temperature controller 2 (shown by dashed-line block embodiment). The bobbin 410 is fixed to the tubular hub 120 by means of a fixed plate 430 so as to be disposed within the large space 250. The clutching plate member 330 is optionally provided with a fan blade member 500 attached thereto through a spacer 510.

As shown in FIGS. 3 and 4, the cooling system according to the present invention operates as follows.

First, when the vehicle engine is not operating, the semi-permanent magnet ring 370 is attached to the ring plate 343 by the magnetic force from the permanent magnets 373 (FIG. 3).

Second, after the vehicle engine is started, but before the temperature of the vehicle engine increases to about 85° C., the copper wire 420 of the electromagnetic ring 400 is not energized by a controller 2 such as a thermostat switch (not shown). Therefore, the surface 374 of the semi-permanent magnet ring 370 remains in a relationship spaced apart from the inner raised portion 220 so that the belt pulley member 200 rotates by itself.

Third, when the temperature of the vehicle engine increases to a certain amount of about 84° C., the electric copper wire 420 of the electromagnetic ring 400 is energized by the controller 2. Therefore, the surface 374 of the semi-permanent magnet ring 370 is attached to the inner raised portion 220 and the end hook 352 of the buffer spring 350 is engaged with the engaging slot 376 of the semi-permanent magnet ring 370. At this time, the belt pulley member 200 rotates with the clutching plate member 330 so as to rotate the water pump impeller 320 since the end hook 352 is engaged with the engaging slot 376.

Fourth, when the temperature of the vehicle engine is decreases below 85° C., the copper wire 420 of the electromagnetic ring 400 is de-energized by the controller 2. Therefore, the outer surface 374 of the semi-permanent magnet ring 370 is no longer attracted by the electromagnetic ring 400 and simultaneously, the semi-permanent magnet ring 370 is attached to the ring plate 343 by the magnetic force from the permanent magnets 373 so that the belt pulley member 200 rotates by itself.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A cooling system for use with the engine of a vehicle, comprising:
   a pump housing mounted to the vehicle engine, said pump housing having a first side and a second side, said first side facing toward the engine, said second side facing away from the engine, and a tubular hub extending outward form said second side away from the vehicle engine, said hub including an outer circumferential surface and an inner surface, said inner surface surrounding the central cavity of said hub.
   a belt pulley member, said belt pulley member having a belt pulley bearing ring disposed therein for operatively, rotatably receiving said hub, a raised portion disposed radially outward from said bearing ring, said portion having a plurality of circular arc shaped apertures, and a belt engagement member,
   a rotor member, said rotor member including a rotor shaft, said shaft being rotatably disposed through the central cavity of said hub, and having a first end and a second end, and a water pump impeller, said impeller being disposed at said first end, a clutching plate member, said plate member being disposed at said second end of said rotor shaft, said plate member including a semi-permanent magnet ring, said magnet ring having a first surface and a second surface, said first surface having a plurality of magnet affixing positions, each of said positions having a permanent magnet disposed thereat, and a first slot, and an electromagnetic ring, said electromagnetic ring being disposed surrounding said outer circumferential surface of said hub and, said electromagnetic ring being at a predetermined temperature of the vehicle engine, whereby when the temperature of the vehicle engine is below said predetermined temperature, said electromagnetic ring does not actuate, and when the temperature of the vehicle engine reaches said predetermined temperature, said electromagnetic ring energizes and said semi-permanent magnet ring moves toward said electromagnetic ring so that said plate member and said belt pulley member rotate together so as to rotate said water pump impeller.

2. The cooling system of claim 1, wherein said hub further includes a pair of snag rings disposed on said outer circumferential surface for preventing said belt pulley member from moving in the longitudinal direction of said hub.

3. The cooling system of claim 1, wherein said belt pulley member further includes a circumferential inner wall, a circumferential outer wall, and a belt engagement member, a first space being defined by said inner wall, said raised portion, and said outer wall, and a second space being defined by said inner wall, said raised portion and said belt engagement member.

4. The cooling system of claim 1, wherein said plate member further includes a circular plate, said plate having a second slot, a buffer spring, said spring having a first end and a second end, said first end being formed into a first end hook, said second end being formed into a second end hook, said first end hook and said second end hoop being engageable with said first slot of said semi-permanent magnet ring and said second slot of said plate, respectively.

5. The cooling system of claim 1, wherein said predetermined temperature is about 85°

* * * * *